(12) United States Patent
Keyhl et al.

(10) Patent No.: US 7,680,056 B2
(45) Date of Patent: Mar. 16, 2010

(54) APPARATUS AND METHOD FOR EXTRACTING A TEST SIGNAL SECTION FROM AN AUDIO SIGNAL

(75) Inventors: Michael Keyhl, Heroldsberg (DE); Christian Schmidmer, Nürnberg (DE); Roland Bitto, Nuremberg (DE)

(73) Assignee: Opticom Dipl.-Ing M. Keyhl GmbH, Erlangen (DE)

( * ) Notice: Subject to any disclaimer, the term of this patent is extended or adjusted under 35 U.S.C. 154(b) by 1066 days.

(21) Appl. No.: 11/286,311

(22) Filed: Nov. 23, 2005

(65) Prior Publication Data

US 2006/0177003 A1 Aug. 10, 2006

Related U.S. Application Data

(63) Continuation of application No. PCT/EP2004/006487, filed on Jun. 16, 2004.

(30) Foreign Application Priority Data

Jun. 17, 2003 (DE) ................................ 103 27 239

(51) Int. Cl.
*H04L 12/26* (2006.01)

(52) U.S. Cl. ...................................... 370/241; 704/233

(58) Field of Classification Search ................. 704/233, 704/275, 200, 201; 370/241
See application file for complete search history.

(56) References Cited

U.S. PATENT DOCUMENTS

| 6,336,091 B1 * | 1/2002 | Polikaitis et al. ............ 704/233 |
| 7,139,705 B1 * | 11/2006 | Beerends et al. ............ 704/237 |

FOREIGN PATENT DOCUMENTS

| DE | EP 0644647 | 3/1995 |
| EP | 1 271 470 | 2/2003 |
| WO | WO 02/065456 | 8/2002 |

* cited by examiner

*Primary Examiner*—Brenda Pham
(74) *Attorney, Agent, or Firm*—Thomas, Kayden, Horstemeyer & Risley

(57) ABSTRACT

For extracting signal test sections conforming to an auditory test from an audio signal, in particular for non-intrusive tests for a quality assessment of a transmission system, first of all a temporal structure of the audio signal is parsed in order to differentiate an information-carrying section of the audio signal from a preceding non-information-carrying section of the audio signal or a subsequent non-information-carrying section of the audio signal. Hereupon, a test signal section is generated based on the information-carrying section of the audio signal. Thus, test signal sections conforming to an auditory test are obtained, on the one hand determining the comparability with other auditory tests and, on the other hand, reducing a too inaccurate assessment of the transmission system based on system-immanent artefacts.

19 Claims, 5 Drawing Sheets

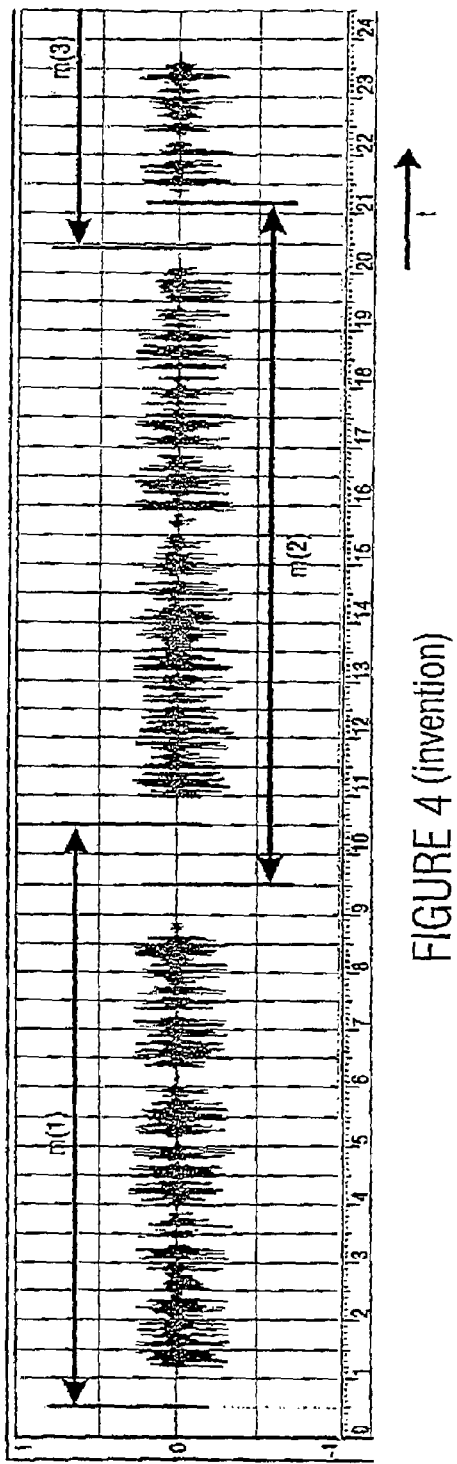
FIGURE 4 (invention)
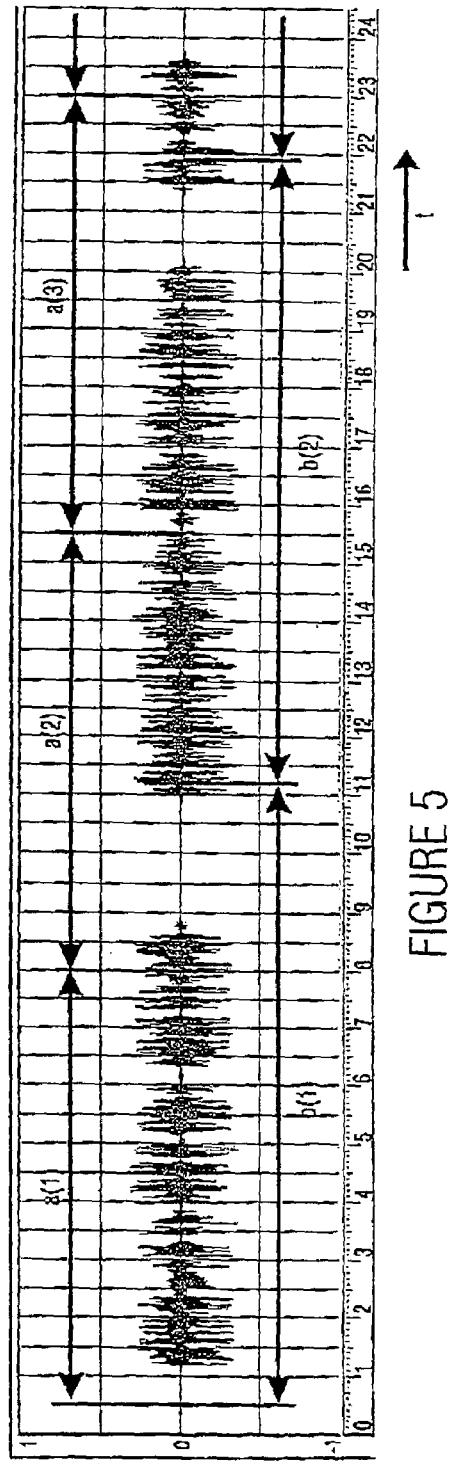
FIGURE 5

APPARATUS AND METHOD FOR EXTRACTING A TEST SIGNAL SECTION FROM AN AUDIO SIGNAL

CROSS-REFERENCE TO RELATED APPLICATIONS

This application is a continuation of co-pending International Application No. PCT/EP2004/006487, filed Jun. 16, 2004, which designated the United States and was not published in English.

BACKGROUND OF THE INVENTION

1. Field of the Invention

The present invention relates to auditory tests for evaluating the quality of encoded voice or speech, respectively, and audio signals or for evaluating the quality of a telephone connection, like for example a wire-bonded or wireless telephone connection. In particular, the present invention relates to the provisioning of test signal sections for performing so-called subjective and/or objective measurements for quality assessment.

2. Description of the Related Art

For evaluation of the quality of encoded voice and audio signals in measurement technology, today standardized perception-based measurement methods (perceptual measurements) are used. Known methods are the so-called PESQ method (PESQ=perceptual evaluation of speech quality) described in the standardization document ITU-T P.862 (02/2001). Another known measurement method for quality assessment is the so-called PEAQ method (PEAQ=objective measurements of perceived audio quality) and is illustrated in the standardization document Rec. ITU-R BS. 1387-1 (1998-2001). These methods or further methods for quality assessment, respectively, have in common that a signal to be tested ("test signal") which is in general the output signal of a system or network or generally of an element to be tested (DUT) is compared to an original or also reference signal which is in general the input signal into the DUT to be tested.

Such a general setting is illustrated in FIG. 6. The original audio signal which is fed into a DUT 600 here represents the reference signal or input signal, while the output signal behind the DUT 600 is used either to perform a subjective auditory test with test persons, as it is indicated by a subject 602, or a quality assessment method, like for example to perform PESQ or PEAQ, as it is illustrated by a model 604. By feeding the output signal from the DUT 600 to the subject 602, thus a subjective auditory test may be performed which is typically performed with several test persons in standardized rooms. By feeding the original audio signal before the DUT 600, i.e. the reference signal, and the audio signal distorted by the DUT to the model 604, an objective test, i.e. an algorithmic evaluation without subjective test persons, may be performed.

The DUT 600 is typically a system whose influence on the auditory quality is to be evaluated. Such a system is, for example, a telecommunications connection and in particular a telephone connection which may be wireless or wire-bonded. An alternative DUT 600 is, for example, an encoder/decoder path, in order to assess the quality impairment of an encoding concept having a downstream decoding concept. The output of the model, when the model operates in the intended way, is to be a prediction of the perceived quality which test persons would subjectively indicate on a scale when they hear the output signal of the DUT 600.

In the PESQ method, for example, the original audio signal, i.e. the audio signal before the DUT 600, which is the reference signal, is compared to the audio signal distorted by the DUT 600 considering a time delay, wherein a psycho-acoustic model is used. In particular, both the original audio signal before the DUT 600 and also the distorted audio signal after the DUT 600 are converted into a so-called internal representation which is analog to the psycho-physical representation of audio signals in the human auditory system, wherein in particular parameters like the bark scale and sone are considered, as it known in the art. The internal psycho-physical representation of the original audio signal is then compared to the internal psycho-physical representation of the distorted audio signal in order to calculate one or several error parameters, depending on the model, which allow a quantitative quality indication.

A quality assessment method illustrated with reference to FIG. 6 is also referred to as an "intrusive" method, as feeding in the reference signal, i.e. the original audio signal, into the system to be tested (DUT 600) is necessary. At the output of the DUT, as has been indicated, the test signal to be evaluated is obtained which is also referred to as the distorted audio signal or in general as the audio signal, respectively, in FIG. 6. The output of the DUT 600 may, for example, be the remote end of a telephone connection of two subscribers, wherein the original audio signal is fed in at the close end as the reference signal. In this case, the measurement method, like for example PESQ, would characterize the quality of speech of a telephone connection.

As it has been explained, the algorithmic measurement methods are based on a combination of psycho-acoustic and cognitive findings about human auditory perception. The basic experiment of those methods mainly is that a subjective auditory test is performed in which a statistically sufficient number of test listeners (subjects) is presented with a series of voice (speech) or audio sequences, respectively, for assessment. The testers assess those sequences using a discrete or continuous quality scale, respectively, also referred to as "opinion scale" and for example ranging from 1 ("bad") to 5 ("excellent"). Such subjective auditory tests are, for example, represented in the standardization document ITU-T P.800 (08/1996).

It has been found that real test persons can only qualitatively evaluate short sequences. If the test persons are presented a longer sequence, i.e. a longer test signal section, then so to speak a "statistical averaging" takes place. In other words, the cognitive process of forgetting of heard interferences leads to a corruption of the statements of the test persons, wherein this corruption is inherent in a system due to the fact that the test persons are human.

Consequently, thus, in standardized test processes, like for example in the standardization document Rec. ITU-R BS.1116-1 or Rec. ITU-R BS.1534, test sequences are mandatory having a duration of typically between 8 and 12 seconds, whose maximum length does not exceed 20 seconds, however. Although these test sequences are real signals, they do not, however, stochastically or randomly come from a real scenario, respectively, but are standardized predetermined test sequences that may be fed into the DUT to be observed in an experiment in order to obtain the test input signal, i.e. the audio signal distorted through the DUT.

In recent times, developments have been presented which also allow performing non-intrusive tests which are to facilitate an estimation of the speech quality merely based on an analysis of the test signal on the receive side, i.e. without feeding in a reference signal on the transmit side. Such developments are of special advantage for practical realizations, as they allow, for example, an indication of the speech quality of a mobile radio connection only in the terminal device without any measurement technology arrangements or preconditions and/or manipulations of any kind in the telephone network being required, so to speak, for feeding in a reference signal. It should be possible to subject every real telephone conversation to such a non-intrusive concept of a quality assessment.

This new non-intrusive concept is currently being developed. It is assumed that, for reasons of comparability with intrusive measurement concepts, test sequence lengths will be mandatory also for the non-intrusive measurement concept, which are similar to the test sequence lengths from the intrusive tests, i.e. which are selected such that for the test listener no so-called "statistical averaging" or forgetting of an error occurs due to a sequence which is too long, and which are on be made. As it has already been indicated, the duration of the test sequences is typically between 8 to 12 seconds, whereas sometimes also test sequences, i.e. test signal sections, with 20 seconds at maximum are admitted.

In particular with non-intrusive quality assessments of a distorted audio signal or in the assessment of an influence of, for example, a transmission channel 600 in FIG. 6 to the audio signal, respectively, working with predefined test signal sections is not easily possible any more. Instead, real audio signals have to be used for quality assessment. Nevertheless, a comparability of the measurement results is to be guaranteed, as this is a main advantage of standardized quality assessment methods, i.e. that the results of different tests should be comparable.

In the following, with reference to FIG. 5, the thus resulting problem is illustrated. FIG. 5 shows a time diagram of a signal transmitted via a telephone connection, i.e. an audio signal which was distorted by the transmission via a telephone connection. In the time diagram of FIG. 5, along the ordinate a normalized amplitude is plotted, while along the abscissa the time t is plotted. The signal illustrated in FIG. 5 clearly shows the characteristic of a voice signal in so far that, on the one hand, information-carrying sections, like for example the section between one second and nine seconds, are present and that the information-carrying sections are separated from each other by non-information-carrying sections, also referred to as pauses. The non-information-carrying section following after the first information-carrying section extends from about 9 seconds to about 10.8 seconds. Then again a longer information-carrying section from 10.8 seconds to about 20.2 seconds follows. After this second information-carrying section again a pause between 20.3 seconds approximately and 21.3 seconds follows. After the second pause again an information-carrying section follows extending approximately to 23.7 seconds, whereupon again a pause follows.

The simplest possibility for extracting test signal sections would be to break down the audio signal illustrated in FIG. 5 into adjacent sections of equal length. A kind of fragmenting in order to obtain test signal sections having a duration of about 10 seconds is illustrated by b(1), b(2) etc. Another way of fragmenting the audio signal illustrated in FIG. 5 to obtain test signal sections having a duration of, for example, 7.5 seconds, is illustrated by a(1), a(2), a(3), etc.

The fragmentation of the audio signal into sections of a constant length is problematic in so far that it may no longer be calculated how large the information-carrying section in a test signal section is and how large the non-information-carrying section in a test signal section is, i.e. how large the weighting of information/pause is. In addition to that, it may be the case in particular in telephone conversations that longer pauses occur between the conversation partners. This would lead to the fact that a test signal section would, for example, only consist of a pause. It may easily be seen that, only based on a pause, no quality assessment is possible.

The procedure illustrated in FIG. 5 is only "good" when each telephone conversation is, for example, always shorter than 20 seconds, so that the complete telephone conversation may be taken as a test signal section. If this is not the case, then a breaking down into constant time sections, as it was illustrated in FIG. 5, does not result in a comparability with a subjective auditory test result. In addition to that, the measurement periods of different duration will at least lead to different, maybe even useless results. In particular for the measurement in mobile telephone networks from a driving car using so-called "drive test tools", a measurement duration as short as possible or the fragmentation of real test conversations into shorter time intervals or measurement periods, respectively, is desired, as it is indicated by a(1), a(2), a(3) in FIG. 5. These shorter measurement durations are particularly desirable in mobile radio networks in order to correlate the measurement periods with geographical data, in order to obtain a geographically detailed statement in the quality of a mobile radio system.

As already indicated above, FIG. 5 shows the graphical illustration of the time signal of a voice signal, gained from a real telephone conversation. The voice-activity modulation parts, i.e. the information-carrying sections of the signal, here spoken sentences, as well as the pauses of voice in between, i.e. the non-information-carrying sections, may easily be seen. It is to be noted that on the listener side of the one end of the current communication the signal indicated in FIG. 5 was recorded. As it was explained, substantially longer pauses in which the opposing person talks occur in a conversation. These are omitted for clarity in FIG. 5.

In FIG. 5 two possible fragmentations are illustrated based on a division into fixed time sections. It may clearly be seen that a time section may begin (a(2), b(2)) or end (a(1), a(2), . . . , b(1)) within the modulation, i.e. of a word or sentence.

In addition to that it may also happen and will particularly be the case in a dialog, that a test signal section may mainly or completely consist of a pause, as it may, for example, partially be seen with reference to the test signal section a(2) which consists to one third of a pause.

The partitioning into fixed time sections of an audio signal to be assessed thus does not meet the requirements of sequences suitable for an auditory test, i.e. voiced examples typically having two sets of a maximum duration of 20 seconds. It is further desired that such sequences suitable for an auditory test ideally start with pauses, end with pauses and are in particular also separated by pauses when subsequent test signal sections are regarded.

In addition to that, the "hard" switching on and off in modulation parts, like, for example, the hard switching off of the information-carrying section in the test signal section a(1), leads to interference noise which may also be referred to as spectral interference noise or "crackle". In signal theory, the hard clipping of a modulation part indicates the convolution of the signal using a jump function. This interference noise or artefacts, respectively, would be evaluated as an interference by a measurement method, which would directly lead to the fact that, for example, a communication connection is assessed to be worse than it actually is.

SUMMARY OF THE INVENTION

It is the object of the present invention to provide an improved concept for extracting a test signal section from an audio signal.

In accordance with a first aspect, the present invention provides a device for extracting a test signal section from an audio signal, having a parser for parsing a temporal or spectral structure of the audio signal in order to differentiate an information-carrying section of the audio signal from a preceding non-information-carrying section of the audio signal or a subsequent non-information-carrying section of the audio signal; and a generator for generating the test signal section based on the information-carrying section of the audio signal.

In accordance with a second aspect, the present invention provides a method for extracting a test signal section from an audio signal, with the steps of parsing a temporal or spectral structure of the audio signal in order to differentiate an information-carrying section of the audio signal from a preceding non-information-carrying section of the audio signal or a subsequent non-information-carrying section of the audio signal; and generating the test signal section based on the information-carrying section of the audio signal.

In accordance with a third aspect, the present invention provides a device for a quality measurement of a transmission channel, having a receiver for receiving an audio signal from the transmission channel; an extractor for extracting one or several test signal sections according the above mentioned aspect; and an assessor for a quality assessment of the transmission channel on the basis of the one or the several test signal sections.

In accordance with a fourth aspect, the present invention provides a method for a quality measurement for a transmission channel, with the steps of receiving the audio signal from the transmission channel; extracting one or several test signal sections using the method for extracting a test signal section from an audio signal, with the steps of parsing a temporal or spectral structure of the audio signal in order to differentiate an information-carrying section of the audio signal from a preceding non-information-carrying section of the audio signal or a subsequent non-information-carrying section of the audio signal; and generating the test signal section based on the information-carrying section of the audio signal; and assessing the quality of the transmission channel on the basis of the one or several test signal sections In accordance with a fifth aspect, the present invention provides a computer program having a program code for performing one of the above-mentioned methods, when the computer program runs on a computer.

The present invention is based on the finding that for the extraction of a test signal section first of all the time structure of the audio signal has to be parsed in order to differentiate an information-carrying section of the audio signal from a preceding non-information-carrying section of the audio signal and a subsequent non-information-carrying section of the audio signal. On the basis of the analysis of the audio signal with regard to the detection of the information-carrying sections, then a test signal section is generated based on the information-carrying section of the audio signal. Then, the procedure of dividing into fixed adjacent signal sections is left. According to the invention, test signal sections are now gained in so far, that the audio signal is subjected to a signal analysis with regard to its time structure and with regard to its information content in order to gain, based on the thus gained findings for the further processing, signal sections, i.e. test signal sections, mainly corresponding to those of test sequences conforming to auditory tests. The inventive fragmentation of the audio signal into test signal sections is thus not performed independent of a signal but in a way adapted to a signal.

It is an advantage of the present invention that the audio-signal-adaptive extraction of a test signal section leads to the fact that system-immanent artefacts are prevented. Instead, test signal sections conforming to auditory tests are gained enabling the application and distribution of non-intrusive measurement concepts.

It is a further advantage of the present invention that no DUT modifications or reference signals, respectively, are required, but that the inventive concept generates test signal sections from real audio signals that may be manipulated within large boundaries with regard to their criteria typically predetermined by auditory tests.

In a preferred embodiment of the present invention, the analysis of the audio signal takes place by a voice activity detection, a pause detection or a noise detection, respectively, or a downstream voice detection.

The test signal section may, as far as the time lengths are sufficient, directly contain a complete information-carrying section of the audio signal. Depending on the implementation, however, also a manipulation at an information-carrying section of the audio signal may be performed, for example in order to add pauses at the beginning and at the end of an information-carrying section in order to generate a predefined relation of, for example, voice modulation to, for example, pause.

By providing a predetermined minimum value for the time length of the test signal section and a predetermined maximum value for the time length of a test signal section it is possible in a preferred embodiment of the present invention to generate test signal sections conforming to auditory tests even from longer information-carrying sections preferably by slow fading in and out, wherein the same are substantially free from artefacts, as the unnatural fast switching on and/or off of an information-carrying section is concealed.

The present invention is advantageous in particular in so far that it transforms any audio signal typically comprising long pauses into a sequence of test signal sections, each of which consists, to a specifiable minimum amount, of an information-carrying section of the audio signal. Thus, so to speak automatically, the usual long pauses are cut out. A quality assessment of the transmission channel which the audio signal comes from then performs this quality assessment using only sensible test signal sections and does not waste resources by vainly attempting a quality assessment of pauses of a subscriber, for example in a telephone conversation.

BRIEF DESCRIPTION OF THE DRAWINGS

Preferred embodiments of the present invention are explained in more detail in the following with reference to the accompanying drawings, in which:

FIG. 4 shows an illustration of the fragmentation of an audio signal as it is achieved by the present invention;

FIG. 5 shows a fragmentation of the audio signal into test signal sections of equal length.

DESCRIPTION OF THE PREFERRED EMBODIMENTS

Figure 1:
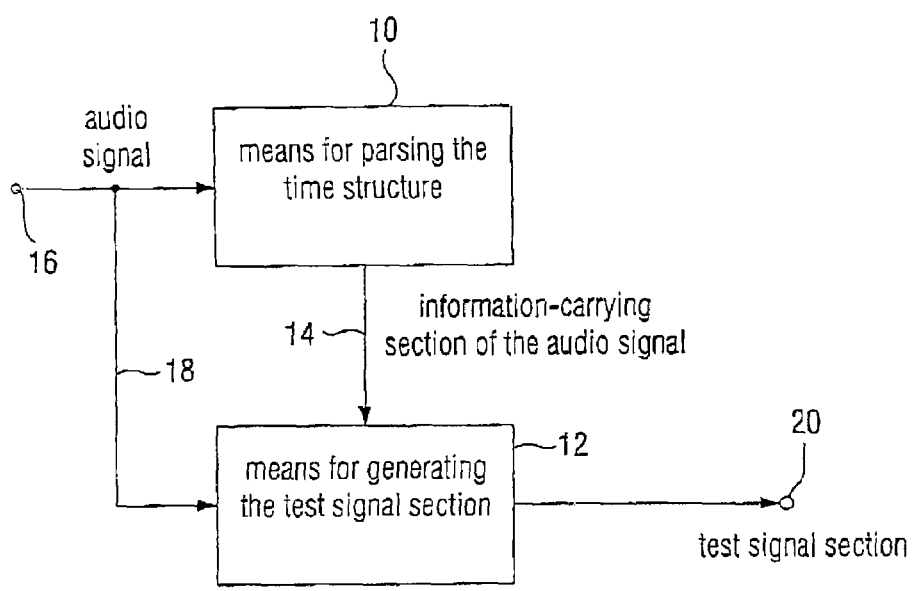
FIG. 1 shows a block diagram of a device for extracting a test signal section according to a preferred embodiment of the present invention.

FIG. 1 shows a preferred embodiment of an inventive device for extracting a test signal section from an audio signal. The audio signal is fed to means 10 for parsing a time structure of the audio signal. Means 10 for parsing the time structure of the audio signal is operable to differentiate an information-carrying section of the audio signal from a preceding non-information-carrying section of the audio signal and a subsequent non-information-carrying section of the audio signal. Downstream from means 10, means 12 for generating the test signal section is arranged which preferably conforms to an auditory test, based on the information-carrying section of the audio signal which is in an alternative provided by a connecting line 14 from means 10. Alternatively, means 10 may also be implemented in order to output an indication as to where in an audio signal an information-carrying section begins, and where it ends, for example by indicating the samples, when the audio signal is present in a time-discrete form, or by outputting absolute points in time. In such a case, means 12 for generating the test signal section is operable based on the information-carrying section of the audio signal in order to extract, using the corresponding indications on line 14, the corresponding information-carrying section or at least a part of the information-carrying section, respectively, directly from the audio signal provided via an input 16, as it is illustrated by a connecting line from input 16 to means 12, designated by 18 in FIG. 1. As it was implemented, means 12 preferably generates a sequence of test signal sections at an output 20 of the device indicated in FIG. 1.

FIG. 4 shows the mode of operation of the inventive concept illustrated with reference to FIG. 1. Means 10 for parsing is operable to detect the information-carrying section extending from about 1.3 seconds to about 8.8 seconds. For examining the audio signal with regard to an information-carrying section and a non-information-carrying section, for example a pause or a noise, many known methods in the art exist, like for example a voice activity detection, a prediction method, a pause detection method, level detections, gradient methods, etc. All of those methods are based on examining a quick change of the signal amplitude from a slow change of the signal amplitude considering the absolute change across a certain period of time. Quick changes additionally taking place with a certain amplitude, i.e. with a certain loudness level, indicate so-called voice-active modulation portions when the signal is a voice signal, as it is illustrated in FIG. 4. Slow changes, however, on a low level or quick changes on a relatively constant level indicate pauses or noise, respectively, i.e. non-information-carrying sections of the audio signal. Other methods, for example, differentiate noise from voice by spectral analysis and correlation.

Means 12 for generating the test signal sections is now operable, for example to perform the fragmentation of the audio signal into test signal sections m(1), m(2), m(3), . . . , so that an information-carrying section has a preceding and subsequent non-information-carrying section, as it may be seen, for example with reference to the test signal sections m(1), m(2), m(3) in FIG. 4. In detail, means for generating the test signal section, as it is illustrated in FIG. 1 at 12, is operable to extract an information-carrying section of the audio signal directly from the audio signal and to add at least a part of the preceding non-information-carrying section of the audio signal and a part of the subsequent non-information-carrying section in order to obtain a test signal section with a certain predefined length.

This procedure is practicable when the information-carrying section of the audio signal is shorter than a predetermined maximum length of a test signal section, i.e. for example 12 seconds or up to 20 seconds. This boundary condition should in particular be the case with voice signals as they occur across telephone connections.

If the audio signal is a music signal, however, then it may be the case that an information-carrying section of the music signal, i.e. a portion with a modulation above a certain modulation threshold value, is longer than the predetermined maximum length. If this is the case, then means 12 for generating the test signal section is operable to generate a test signal section so that first based on a pause situation the information-carrying section is gradually faded in, in so far that an attenuation is gradually reduced from 1 to 0. Then, the information-carrying section is directly taken over from the audio signal, i.e. up to a predetermined point in time, in which then again a slow gradual fading out takes place by increasing an attenuation factor again from 0 to 1 in order, finally, at the end of the test signal section, to again artificially produce, i.e. to synthesize, a pause situation.

Figure 2:
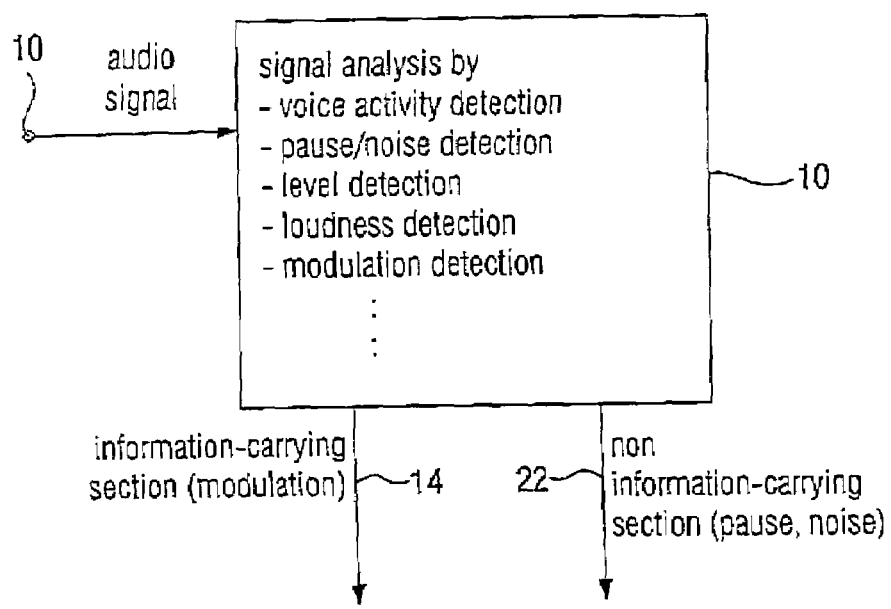
FIG. 2 shows a schematic illustration of means for parsing of FIG. 1 according to a preferred embodiment of the present invention.

In the following, with reference to FIG. 2, a detailed illustration of means 10 for parsing is given. Again, means 10 for parsing obtains the audio signal from an audio signal input 10. On the output side, the signal analysis means 10 provides an indication to the information-carrying section or the non-information-carrying section itself. Alternatively or additionally, means 10 provides an indication to a non-information-carrying section or the non-information-carrying section itself, as it is represented by an output line 22. Signal analysis means 10, in preferred embodiments of the present invention, performs a signal analysis by means of a voice activity detection, a pause/noise detection, a level detection, a loudness detection, a modulation detection, etc. All of those concepts are based on the fact that an information-carrying section is correlated with the feature to be detected in so far that the feature may be detected when the section of the audio signal carries useful information, and that the feature to be detected is not present when the portion of the audio signal which is considered does not carry corresponding useful information, or vice versa. If the audio signal is, for example, present as a voice signal, then means for signal analysis is operable in order to determine, by means of a voice activity detection, the beginning and the end of an information-carrying section of the audio signal, i.e. for example of a voice-active modulation section. Alternatively or additionally, signal analysis means 10 may perform a pause detection or in real networks a noise detection, respectively, in order to determine the position and length of the pauses of voice. An information-carrying section is then the section between two pauses of voice, although it is not directly detected but, so to speak, indirectly, by detecting the preceding and subsequent pause of voice. A pause detection alone, i.e. a detection of a preceding and a subsequent non-information-carrying section with regard to a considered information-carrying section thus also provides a differentiation of the information-carrying section of the audio signal from a preceding non-information-carrying section of the audio signal and a subsequent non-information-carrying section of the audio signal.

Figure 3:
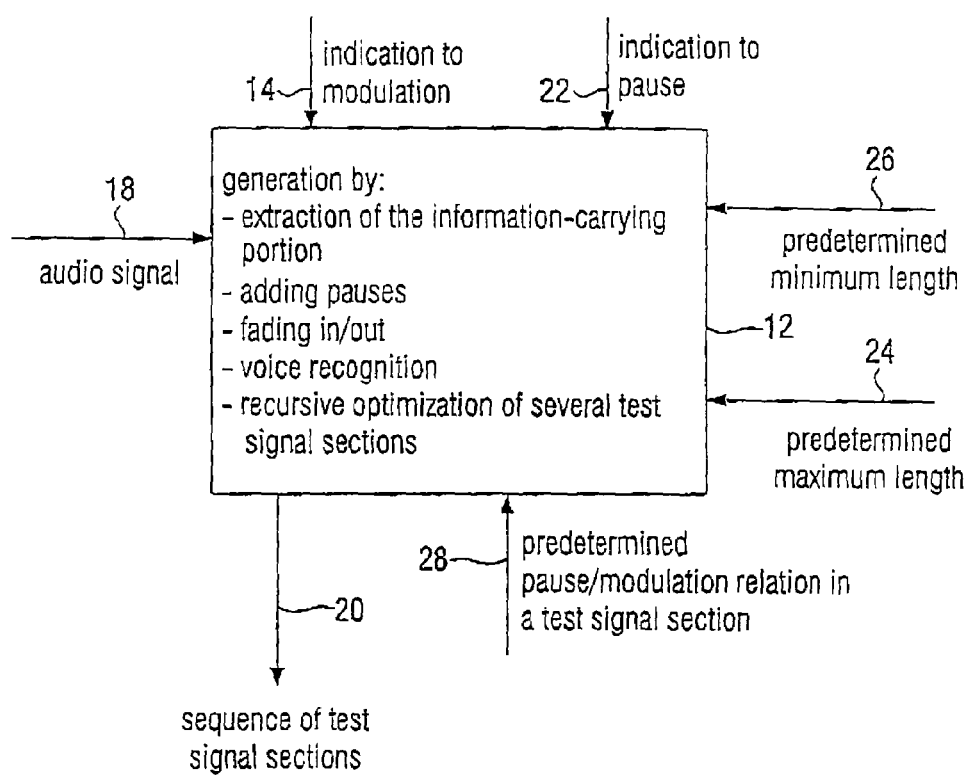
FIG. 3 shows a detailed illustration of means for generating of FIG. 1 according to a preferred embodiment of the present invention.
Figure 6:
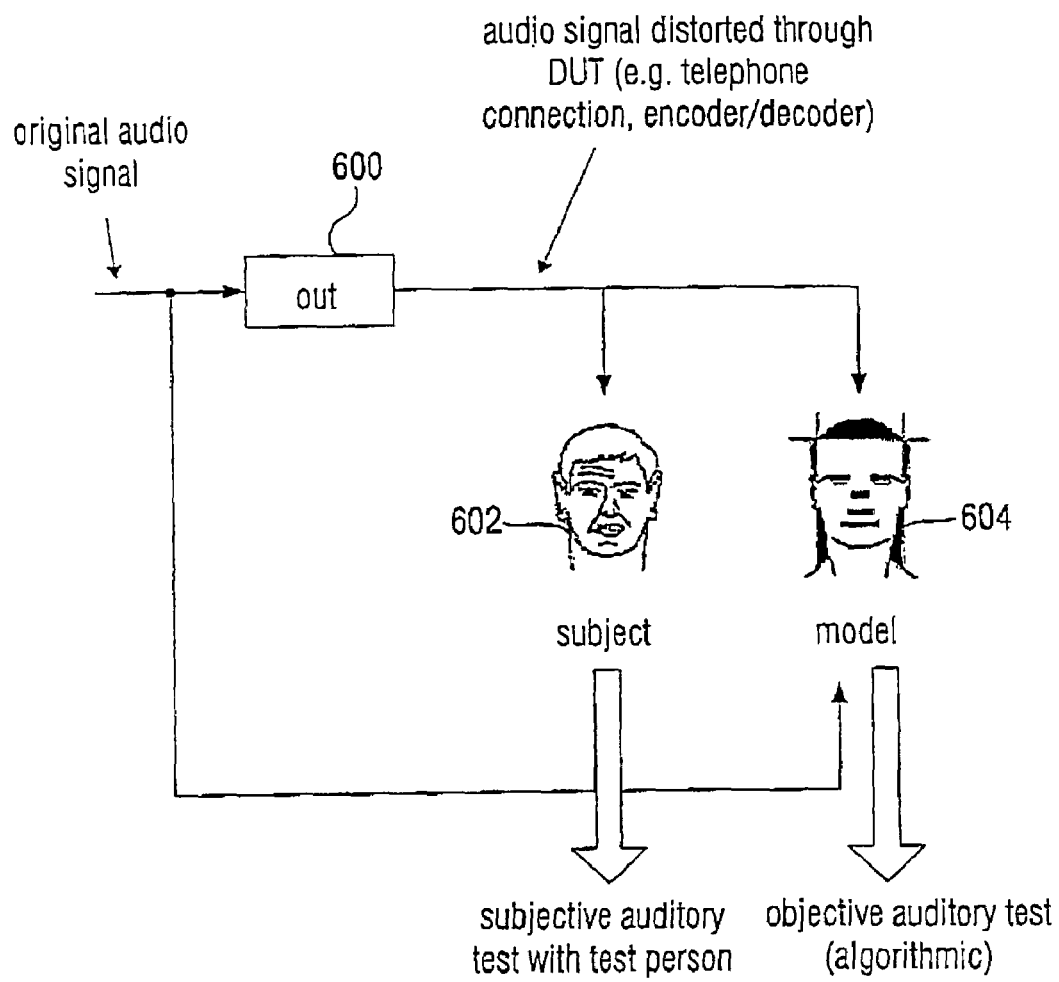
FIG. 6 shows an overview diagram for explaining the basic functioning of an intrusive auditory test for a quality assessment of a system to be tested.

Alternatively or additionally, means for parsing the audio signal may be implemented in order to parse, by means of a downstream voice recognition, also known in the art as ASR or "automatic speech recognition", speech or contexts of sentences in order, for example, if required, to always extract a test signal section with a predetermined number of words or a predetermined number of sentences, respectively. This functionality may also, as illustrated with reference to FIG. 3, be taken over by means 12 for generating the test signal sections, represented in FIG. 3 according to a preferred embodiment of the present invention. Via lines 14 or 22 of FIG. 2, respectively, means 12 for generating a test signal section for example obtains an indication to an information-carrying section, i.e. to a modulation and/or an indication of a pause, respectively, i.e. a non-information-carrying section of the audio signal, provided via line 18 of means 12. Means 12 further obtains information about a predetermined maximum length via a further input 24, and information about a predetermined minimum length via a further input 26. Further, in a preferred embodiment of the present invention, a predetermined pause/modulation ratio in a test signal section is aimed at. The information as to which pause/modulation ratio is predetermined may be supplied to means 12 for generating the test signal sections via a further input 28.

Means 12 for generating a test signal section is operable, in a preferred embodiment, to add pauses at the beginning and at the end of an identified information-carrying section in order to generate a defined relation of speech modulation to pause, such as, for example, 40% speech modulation and 60% pause. Should an information-carrying section be too long, then means 12 in a preferred embodiment of the present invention is operable to provide a functionality for fading in and out in order to softly fade the information-carrying section in or out. If an information-carrying section of the audio signal is not as long as the predetermined maximum length, but longer than is given by the predetermined pause/modulation ratio in a test signal section, then the fade-in/fade-out functionality may also be performed in order to "shorten" the information-carrying section in favor of a longer non-information-carrying section.

In a preferred embodiment of the present invention, further a recursive processing of the steps of voice activity detection, pause detection, downstream speech detection and adding pauses is performed in order to form test signal sections conforming to an auditory test which will, for example, be speech sequences having a different length, whose respective duration is, however, within the predetermined minimum length $t_{min}$ and the predetermined maximum length $t_{max}$.

The inventive concept is thus operable to generate for each audio signal of a duration t a series of i test signal sections, wherein it holds true:

$$0 \leq i \leq \frac{t}{t_{min}}$$

wherein $t_{min}$ defines the predetermined minimum duration for a sequence.

The thus generated test signal sections or fragments of the audio signal, respectively, which may, as it is illustrated in FIG. 4, in a preferred embodiment of the present invention, have overlaps, are now supplied to a further process, for example a perception-based measurement method for determining the speech quality according to ITU-T P.862 (PESQ). Simultaneously, the generated fragments may also be used, for example, for a subjective auditory test according to ITU-T P.800.

It may be seen that the test signal sections generated according to the invention, as illustrated in FIG. 4, in contrast to the test signal sections having a constant length, no longer contain sequences only including a pause, i.e. "zero signals", so that the number of sequences is minimized depending on the modulation for a given audio signal and may even be 0 in an extreme case when the audio signal comprises no information-carrying section, i.e. consists only of a pause or noise, respectively. This result corresponds to the requirement that a measurement method may not evaluate a signal exclusively consisting of noise or a pause.

In the following, a fragmentation of an audio signal into test sequences conforming to an auditory test according to ITU-R BS.111.6 or BS.1534, respectively, is discussed.

Analog to the inventive fragmentation of a voice signal into test sequences conforming to an auditory test according to ITU-T P.800, according to the invention, a music signal is also fragmented into approximately 10 to 20 seconds long sequences. In a preferred embodiment, means 10 for parsing is implemented in order to perform a level detection, a loudness detection or a modulation detection in case of a music signal in order to determine the beginning and the end of modulation sections, i.e. of an information-carrying section. Further, means 10 is implemented in order to determine, by means of a pause detection, or in real networks, by means of a noise detection, the position and length of the pauses, also referred to as silence intervals in the art.

It is again preferred, in a modulation which is too long, i.e. an information-carrying section which is too long, if applicable, to softly fade the musical signal in and out by means of a downstream fade-in/fade-out automatics.

It is further preferred, by adding pauses to the beginning and to the end of an identified information-carrying section, to generate a defined relation of modulation to pause, such as, for example, 40:60.

Again, in a preferred embodiment of the present invention, a recursive use of the steps of level, loudness or modulation detection, pause detection, fade-in/fade-out automatics and adding pauses is performed in order to form audio sequences of a different length whose duration is within the predetermined minimum and maximum lengths $t_{min}$ and $t_{max}$.

With regard to an exemplary definition of the loudness and the modulation, reference is made to the standardization document Rec. ITU-R BS.1387-1, section 3.2 with regard to modulation and section 3.3 with regard to loudness. These sections are enclosed herein by reference.

As a result, again for every audio signal of the duration t a series of i measurement sequences is obtained, wherein it further holds true:

$$0 \leq i \leq \frac{t}{t_{min}}$$

wherein $t_{min}$ defines the predetermined minimum duration for a sequence.

The thus gained and rendered test signal sections or fragments, respectively, may now be supplied to a further process, for example a perception-based measurement method for determining the audio quality according to ITU-R BS.1387-1 PEAQ. Simultaneously, the generated fragments may also be used for a subjective auditory test.

In an alternative embodiment of the present invention it is preferred to examine the obtained consecutive test signal sections of a periodical loudness measurement or loudness correction, respectively, for example using known methods as defined in ITU-R WP6P question 2/6 "Audio Metering Characteristics suitable for use in Digital Sound Production". This concept in particular serves for providing a loudness adaptation of sound signals, for example in TV, in order to approach the known problem of level fluctuations with sound signals known under the term "too loud advertising". The inventive concept is advantageous here in particular in so far that in particular the pause/modulation relation of the test signal sections, based on the signal-adaptive extraction of the test signal sections according to the present invention, may be accurately controlled, i.e. that no wrong loudness influences of the sound based on a inaccurate audio signal fragmentation occur.

Depending on the conditions, the inventive method for extracting a test signal section may be implemented in hardware of in software. The implementation may be performed on a digital storage medium, in particular a floppy disc or a CD having electronically readable control signals which may cooperate with a programmable computer system so that the method is performed. In general, the invention thus also consists in a computer program product having a program code stored on a machine-readable carrier for performing the inventive method when the computer program product runs on a computer. In other words, the invention may thus be realized as a computer program having a program code for performing the method for extracting a test signal section from an audio signal when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device implemented on a computer which is programmed to extract a test signal section from an audio signal, the device comprising, implemented on the computer:
   a parser for parsing a temporal or spectral structure of the audio signal in order to differentiate information-carrying sections of the audio signal from a non-information-carrying sections of the audio signal, the information-carrying sections being separated from each other by the non-information-carrying sections of the audio signal, wherein the information-carrying sections and the non-information-carrying sections alternate within the audio signal;
   a generator for generating a sequence of test signal sections based on the information-carrying sections of the audio signal; and
   a transmitter configured to transmit the sequence of test signal sections to a measurement device for a non-intrusive quality assessment resulting in a quality measurement value per test signal section of the sequence of test signal sections.

2. The device according to claim 1, wherein the audio signal comprises voiced portions and pause portions between the voiced portions, and
   wherein the parser is implemented to perform a voice activity detection in order to detect voiced portions as the information-carrying sections arranged in temporal respect between respective two pause portions as the non-information-carrying sections.

3. The device according to claim 1, wherein the audio signal comprises signal portions having a predetermined minimum power and pause portions having a power less than the predetermined signal power, and
   wherein the parser is implemented to perform a pause detection to detect the pause portions consecutive in time between each pair of which a signal portion is arranged as one of the information-carrying sections.

4. The device according to claim 1,
   wherein the audio signal comprises noise portions and intermediate signal portions, and
   wherein the parser is implemented to perform a noise detection in order to detect the noise portions consecutive in time in order to determine the signal portions as the information-carrying section, each of which lies between a respective pair of the noise portions.

5. The device according to claim 1,
   wherein the generator is implemented to generate the sequence of test signal sections based on the information-carrying sections of the audio signal by, for each information-carrying section, determining as to whether the temporal length of the respective information-carrying section is smaller than a predetermined maximum length, and, depending on the determination, taking over, in complete, the respective information-carrying section into a respective one of the test signal sections in the case the temporal length of the respective information-carrying section is smaller than a predetermined maximum length.

6. The device according to claim 1,
   wherein the generator is implemented in order to generate the sequence of test signal sections based on the information-carrying sections of the audio signal by, for a predetermined test signal section, taking over a continuous part of the audio signal containing at least one of the information-carrying sections of the audio signal in complete and one or several of the non-information-carrying sections, so that the predetermined test signal section comprises a predetermined ratio of temporal length of the at least one information-carrying section and temporal length of the one or the several non-information-carrying sections.

7. The device according to claim 1,
   wherein the generator for generating is implemented to generate the sequence of test signal sections by, for a first and a second predetermined test signal section of the sequence of test signal sections, taking over a respective continuous part of the audio signal containing at least a respective one of the information-carrying sections of the audio signal in complete and one or several of the non-information-carrying sections, so that, an endpoint of the first test signal section with regard to the audio signal is in time after a starting point of the second test signal section, so that both the first test signal section and the second test signal section have at least a part of a non-information-carrying section of the audio signal in common.

8. The device according to claim 1,
   wherein the parser for parsing and the generator for generating are implemented to transform the audio signal into the sequence of test signal sections such that the test signal sections are of different length, and such that each test signal section is longer than or equal to a predetermined minimum length and shorter than or equal to a predetermined maximum length.

9. The device according to claim 1,
   wherein the parser is implemented to output a notification when no information-carrying section is detectable in the audio signal.

10. The device according to claim 1,
wherein the generator is implemented to generate a sequence of test signal sections, and further comprises a loudness measurer for a loudness measurement, in order to obtain a loudness value for each test signal section, wherein the loudness values of the test signal sections may be used by a loudness feedback in order to control a loudness course of the audio signal with regard to feedback.

11. A device implemented on a computer which is programmed to extract a test signal section from an audio signal, the device comprising, implemented on the computer:
a parser for parsing a temporal or spectral structure of the audio signal in order to differentiate an information-carrying section of the audio signal from a preceding non-information-carrying section of the audio signal or a subsequent non-information-carrying section of the audio signal; and
a generator for generating the test signal section based on the information-carrying section of the audio signal,
wherein the audio signal comprises voiced portions and pause portions between the voiced portions, and the parser is implemented to perform a voice activity detection in order to detect a voiced portion as an information-carrying section arranged in temporal respect between two pause portions as non-information-carrying sections, and
wherein the parser is further implemented to subject the voiced portion to a speech detection and to parse the information-carrying section with regard to a speech and/or a sentence context, and
wherein the generator is implemented in order to consider the speech and/or the sentence context when generating the test signal section based on the information-carrying section of the audio signal such that the test signal section has a temporal length which is greater than or equal to a predetermined minimum length and smaller than or equal to a predetermined maximum length.

12. The device according to claim 1,
wherein the generator is implemented to generate the test signal sections such that each of the test signal sections has a respective temporal length which is greater than or equal to a predetermined minimum length and smaller than or equal to a predetermined maximum length.

13. The device according to claim 12, wherein the predetermined minimum length lies between 2 and 12 seconds and wherein the predetermined maximum length lies between 12 and 25 seconds.

14. The device according to claim 1,
wherein the generator is implemented in order to take over at least a part of the information-carrying sections of the audio signal unchanged into the test signal sections.

15. A device implemented on a computer which is programmed to extract a test signal section from an audio signal, the device comprising, implemented on the computer:
a parser for parsing a temporal or spectral structure of the audio signal in order to differentiate an information-carrying section of the audio signal from a preceding non-information-carrying section of the audio signal or a subsequent non-information-carrying section of the audio signal; and
a generator for generating the test signal section based on the information-carrying section of the audio signal,
wherein the generator is implemented
to detect a temporal length of the information-carrying section,
to determine whether the temporal length exceeds a predetermined maximum value, and
in the case of exceeding the predetermined maximum value, to fade out a part at the beginning or at the end of the information-carrying section to obtain a modified information-carrying section whose temporal length is smaller than the predetermined maximum value, and
in a transition range between a faded-out portion and a non-modified portion, to obtain a continuous level change of the modified information-carrying section, and
to generate the test signal section so that the test signal section includes the transition range and the non-modified section.

16. The device according to claim 15, further comprising:
a transmitter for transmitting the test signal section to a measurement device for a quality assessment of a transmission system from which the audio signal may be obtained.

17. A device implemented on a computer which is programmed to extract a test signal section from an audio signal, the device comprising, implemented on the computer:
a parser for parsing a temporal or spectral structure of the audio signal in order to differentiate an information-carrying section of the audio signal from a preceding non-information-carrying section of the audio signal or a subsequent non-information-carrying section of the audio signal; and
a generator for generating the test signal section based on the information-carrying section of the audio signal,
wherein the audio signal comprises a music portion, and
wherein the parser for parsing is implemented to perform a level detection, a loudness detection or a modulation detection in order to differentiate a non-information-carrying section from an information-carrying section.

18. A method for extracting a test signal section from an audio signal, comprising:
a computer parsing a temporal or spectral structure of the audio signal in order to differentiate information-carrying sections of the audio signal from non-information-carrying sections of the audio signal, the information-carrying sections of the audio signal and the non-information-carrying sections alternate within the audio signal; and
the computer generating a sequence of test signal sections based on the information-carrying sections of the audio signal; and
the computer transmitting the sequence of test signal sections to a measurement device for a non-intrusive quality assessment resulting in a quality measurement value per test signal section of the sequence of test signal sections.

19. A digital storage medium having stored thereon a computer program having a program code for performing, when the computer program runs on a computer, a method for extracting a test signal section from an audio signal, comprising:
parsing a temporal or spectral structure of the audio signal in order to differentiate information-carrying sections of the audio signal from non-information-carrying sections of the audio signal, the information-carrying sections of the audio signal being separated from each other by the non-information-carrying sections of the audio signal, wherein the information-carrying sections and the non-information-carrying sections alternate within audio signal;
generating a sequence of test signal sections based on the information-carrying sections of the audio signal; and
transmitting the sequence of test signal sections to a measurement device for a non-intrusive quality assessment resulting in a quality measurement value per test signal section of the sequence of test signal sections.

* * * * *